United States Patent
Forutanpour et al.

(10) Patent No.: US 10,008,024 B2
(45) Date of Patent: Jun. 26, 2018

(54) MATERIAL-AWARE THREE-DIMENSIONAL SCANNING

(71) Applicant: QUALCOMM Incorporated, San Diego, CA (US)

(72) Inventors: Bijan Forutanpour, San Diego, CA (US); Sairam Sundaresan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 15/177,180

(22) Filed: Jun. 8, 2016

(65) Prior Publication Data

US 2017/0358119 A1    Dec. 14, 2017

(51) Int. Cl.
   *G06T 15/04*    (2011.01)
(52) U.S. Cl.
   CPC .......... *G06T 15/04* (2013.01); *G06T 2215/16* (2013.01); *G06T 2219/2012* (2013.01)
(58) Field of Classification Search
   USPC .................. 345/419, 426, 582, 583
   See application file for complete search history.

(56) References Cited

U.S. PATENT DOCUMENTS

| | | | |
|---|---|---|---|
| 6,654,013 B1 * | 11/2003 | Malzbender | G06T 15/50 345/426 |
| 6,750,873 B1 * | 6/2004 | Bernardini | G06T 15/04 345/581 |
| 7,589,723 B2 | 9/2009 | Wang et al. | |
| 8,525,846 B1 | 9/2013 | Hickman et al. | |
| 8,730,240 B2 | 5/2014 | Wang et al. | |
| 9,330,494 B2 | 5/2016 | Schultz | |
| 9,679,362 B2 * | 6/2017 | Chmielewski | G06T 5/002 |
| 2003/0030639 A1 | 2/2003 | Ritter | |
| 2005/0237334 A1 * | 10/2005 | Chuter | G06T 15/04 345/581 |
| 2010/0250201 A1 | 9/2010 | Sivovolenko | |
| 2013/0314411 A1 | 11/2013 | Turetzkey | |

(Continued)

OTHER PUBLICATIONS

Debevec, P., et al., "Estimating Surface Reflectance Properties of a Complex Scene under Captured Natural Illumination", USC ICT Technical Report ICT-TR-06.2004, 2004, pp. 1-11.

(Continued)

*Primary Examiner* — Kimbinh T Nguyen
(74) *Attorney, Agent, or Firm* — Qualcomm Incorporated—Toler (57) ABSTRACT

A method for generating one or more two-dimensional texture maps of an object includes receiving an image frame that includes at least a portion of the object from an image capture device. The method also includes determining, at a processor, a color of a particular portion of the object using the image frame and determining a material of the particular portion of the object using the image frame. The method further includes determining at least one other property of the particular portion of the object based on the material. The method also includes generating a pixel value representative of the color of the particular portion of the object and representative of the at least one other property of the particular portion of the object. The method also includes generating at least one two-dimensional texture map based on the pixel value.

29 Claims, 6 Drawing Sheets

(56) References Cited

U.S. PATENT DOCUMENTS

2014/0267340 A1   9/2014  Kettner et al.
2015/0016711 A1   1/2015  Tin
2015/0348285 A1  12/2015  Wang et al.
2015/0348316 A1  12/2015  Porcino et al.

OTHER PUBLICATIONS

Hu, D., et al., "Toward Robust Material Recognition for Everyday Objects", British Machine Vision Conference, 2011, 11 pages.
Ma, W-C., et al., "Rapid Acquisition of Specular and Diffuse Normal Maps from Polarized Spherical Gradient Illumination", Eurographics Symposium on Rendering, 2007, 12 pages.
Sharan, L., et al., "Recognizing Materials Using Perceptually Inspired Features", Int J Comput Vis, Springer, 2013, vol. 103, pp. 348-371.
Sharan, L., et al., "Material perception: What Can You Tell in a Brief Glance?", Journal of Vision, 2014, vol. 14, No. 9, 18 pages.
Liu, C., et al., "Exploring Features in a Bayesian Framework for Material Recognition," IEEE Conference on Compter Vision and Pattern Recognition, 2010, IEEE, Pisctaway, NJ, 8 pages.
International Search Report and Written Opinion—PCT/US2017/026922—ISA/EPO—dated Jul. 26, 2017.
Leung T., et al., "Representing and Recognizing the Visual Appearance of Materials using Three-dimensional Textons", International Journal of Computer Vision, Jun. 1, 2001 (Jun. 1, 2001), vol. 43, No. 1, XP055358568, pp. 29-44, Boston DOI: 10.1023/A:1011126920638.

* cited by examiner

MATERIAL-AWARE THREE-DIMENSIONAL SCANNING

I. FIELD

The present disclosure is generally related to three-dimensional (3D) scanning.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Wireless telephones, unmanned vehicles (e.g., drones), robots, aircraft, automobiles, mounted cameras, personal cameras, and other devices may be configured to capture images. Such images may be used to generate a three-dimensional (3D) model of an object. Typically, to generate texture maps accompanying the 3D model of the object, a texture map generator may generate a two-dimensional (2D) texture map that is used for photorealistic rendering of the 3D model. The texture map generator typically determines color information (e.g., RGB color information) associated with the object based on a sequence of image frames, and the 2D texture map is typically generated based on the color information. For example, the texture map generator may determine that a particular portion of the object is red (R), green (G), blue (B), or a combination thereof. Based on the color, the texture map generator may generate a 2D texture map in which the associated color of the particular portion is represented.

However, the 2D texture map may not adequately reflect other properties of the object. As a non-limiting example, the 2D texture map may not adequately portray the transparency of the object, the material of the object, surface properties (e.g., bumpiness, smoothness, etc.) of the object, light emission properties of the object, a bidirectional reflectance distribution function (BRDF), etc. Thus, a 2D texture map that only includes the color of the object may not adequately portray other properties that allows for more photorealistic rendering by a software renderer or a hardware renderer.

III. SUMMARY

According to one implementation of the disclosed techniques, a method for generating one or more two-dimensional texture maps of an object includes receiving an image frame including at least a portion of the object from an image capture device. The method also includes determining, at a processor, a color of a particular portion of the object using the image frame and determining a material of the particular portion of the object using the image frame. The method further includes determining at least one other property of the particular portion of the object based on the material. The method also includes generating a pixel value representative of the color of the particular portion of the object and representative of the at least one other property of the particular portion of the object. The method also includes generating at least one two-dimensional texture map based on the pixel value.

According to another implementation of the disclosed techniques, an apparatus for generating one or more two-dimensional texture maps of an object includes a processor and a memory storing instructions that are executable by the processor to perform operations. The operations include determining a color of a particular portion of the object using an image frame that includes at least a portion of the object. The image frame is captured by an image capture device. The operations also include determining a material of the particular portion of the object using the image frame. The operations further include determining at least one other property of the particular portion of the object based on the material. The operations also include generating a pixel value representative of the color of the particular portion of the object and representative of the at least one other property of the particular portion of the object. The operations also include generating at least one two-dimensional texture map based on the pixel value.

According to another implementation of the disclosed techniques, a non-transitory computer-readable medium includes instructions for generation one or more two-dimensional texture maps of an object. The instructions, when executed by a processor, cause the processor to perform operations including determining a color of a particular portion of the object using an image frame that includes at least a portion of the object. The image frame is captured by an image capture device. The operations also include determining a material of the particular portion of the object using the image frame. The operations further include determining at least one other property of the particular portion of the object based on the material. The operations also include generating a pixel value representative of the color of the particular portion of the object and representative of the at least one other property of the particular portion of the object. The operations also include generating at least one two-dimensional texture map based on the pixel value.

According to another implementation of the disclosed techniques, an apparatus for generating one or more two-dimensional texture maps of an object include means for capturing an image frame that includes at least a portion of the object and means for determining a color of a particular portion of the object using the image frame. The apparatus also includes means for determining a material of the particular portion of the object using the image frame. The apparatus further includes means for determining at least one other property of the particular portion of the object based on the material. The apparatus also includes means for generating a pixel value representative of the color of the particular portion of the object and representative of the at least one other property of the particular portion of the object. The apparatus also includes means for generating at least one two-dimensional texture map based on the pixel value.

V. DETAILED DESCRIPTION

Particular implementations of the present disclosure are described with reference to the drawings. In the description, common features are designated by common reference numbers throughout the drawings. The techniques described below are generally applicable to a mobile device. However, it will be appreciated that the techniques are also applicable to an unmanned vehicle (e.g., a drone), a robot, an aircraft, an automobile, a mounted camera, a personal camera, a processing system communicatively coupled to mounted cameras, other devices that are attached to (or included within) a processing device compatible to generate texture maps, etc.

Figure 1:
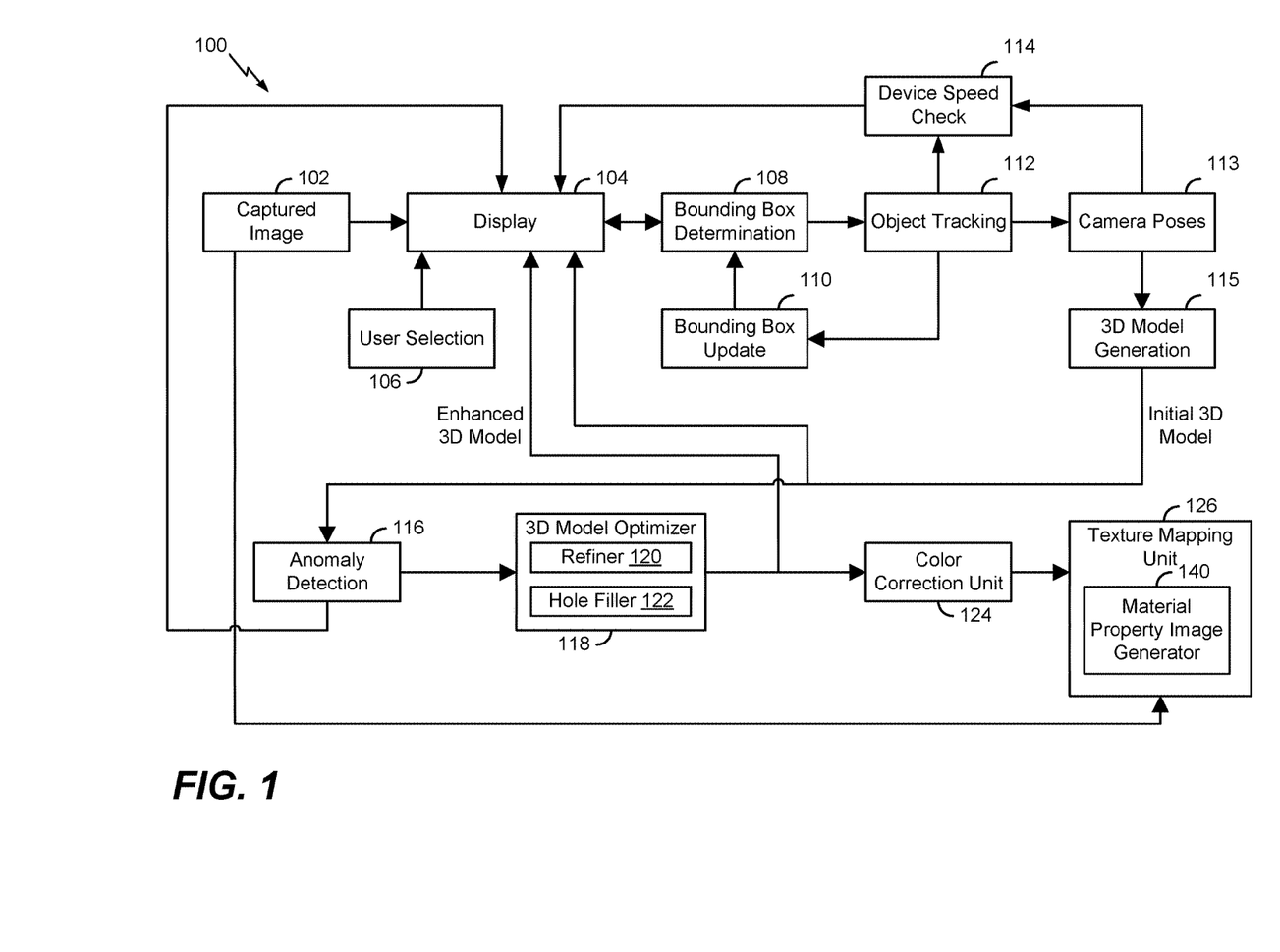
FIG. 1 is a block diagram of a system that is operable to generate one or more two-dimensional (2D) texture maps of an object.

FIG. 1 is a block diagram of a system 100 configured to generate one or more two-dimensional (2D) texture maps of an object. For example, the system 100 may generate one or more 2D texture maps of an object based on a set of captured images 102. The set of captured images 102 may include a sequence of image frames captured by an image capture device, such as a two-dimensional camera (2D) camera, a 3D camera, a 3D sensor, a depth-sensing camera (e.g., a Red-Green-Blue-Depth (RGB-D) camera), or any other device configured to capture images. In alternative implementations, multiple cameras may be used by the image capture device to obtain the set of captured images 102. The image capture device may be associated with a display 104 which may present (e.g., visually display) a representation of a 3D model based on the captured images 102. The displayed representation of the 3D model may be configured to enable a user to correct or enhance a 3D model after initial generation of the 3D model.

The captured images 102 may include multiple images (e.g., 2D images, 3D images, image data, etc.) representative of a scene. For example, the scene may include one or more objects as well as background or other context of the one or more objects. In a particular implementation, one or more of the captured images 102 may be represented via the display 104. For example, as a user captures images of the scene using a camera, the display 104 (or another user interface, such as a projector) may present the images to the user. Additionally, the display 104 (and/or another user interface, such as a keypad or a button) may be configured to enable the user to provide input related to the images. For example, the display 104 may receive a user selection 106. The user selection 106 may enable the user to select a region of interest that includes a particular object within the scene.

The user selection 106 may include information specifying a bounding box around a particular object within the scene. The bounding box may correspond to a region of interest defined by the user. The region of interest may be displayed relative to one or more of the captured images at the display 104. A region of interest defined by the user may be used by a bounding box determination module 108 to determine a bounding box. The bounding box may be associated with the object in a three-dimensional model (e.g., a two-dimensional representation of the object) based on the captured images 102. For example, the bounding box may include or correspond to the region of interest based on object tracking as the camera moves relative to the object.

In a particular implementation, the bounding box may correspond to a cube or other geometric region in three dimensions that corresponds to or includes a portion (e.g., a volume) of the region of interest defined by the user via the display 104. As the camera continues to capture images, an object tracking module 112 may be used to track the region of interest or an object corresponding to the region of interest from one image frame to subsequent image frames. Based on the object tracking, the bounding box may be updated, at a bounding box update module 110. For example, during generation of the three-dimensional model when the camera moves closer to or further from the object, a size parameter of the bounding box may be adjusted based on the object tracking. The bounding box may be associated with multiple size parameters (e.g., (x, y, z) dimension parameters, a center point (x, y, z) coordinate and a spherical radius, etc.). A particular size parameter may be associated with or correspond to a particular dimension of the bounding box (e.g., length, width, or depth). The value of the size parameter may be adjusted based on determining that the object is larger or smaller in the bounding box in one image than in a previous image.

The sequence of images may be used to determine camera poses 113 (e.g., camera pose data). For example, the object tracking module 112 may be configured to determine a camera pose of the image capture device when the image capture device is associated with a 3D scan of an object. The camera poses 113, the object tracking module 112, or both, may be used to determine a device speed. For example, during generation of the captured images 102, a device speed check unit 114 may determine a speed of the image capture device relative to the object based on a plurality of camera poses, based on a plurality of timestamps associated with the camera poses, or both. For example, the speed may be determined based on a calculation of a relative position of a camera corresponding to each camera pose and a timestamp associated with the camera pose. When the speed satisfies a speed threshold, a notification may be presented via the display 104.

In some implementations, the speed may satisfy the speed threshold when the speed is greater than or equal to the speed threshold. In an alternative implementation, the speed may satisfy the speed threshold if the speed is within a range of speeds that correspond to the speed threshold. In some implementations, the notification may suggest that the speed of the image captured device should be reduced because the speed is greater than or equal to the speed threshold. For example, the speed may be reduced in order to reduce errors or to enable more images to be captured within a particular space in order to improve 3D model generation. In another implementation, the speed may satisfy the speed threshold when the speed is less than or equal to the speed threshold. For example, the speed may be increased to reduce the number of redundant images being captured or to utilize additional processing capacity. Further, if the speed is less than or equal to a second speed threshold for a period of time, a notification may be presented via the display 104, and the capture of the sequence of image frames may be paused. For example, the second speed threshold and time may indicate a lack of movement (e.g., the camera is not moving or is relatively still). Capturing of the sequence of image frames may be resumed or reinstated when the camera resumes movement.

Thus, the device speed check unit 114 may calculate a speed associated with movement of the image capture device relative to the object and may selectively output a notification via the display 104 based on a comparison of the relative speed of movement of the image capture device to the speed threshold. In response to determining that the speed satisfies the speed threshold, the system 100 may pause capturing of a sequence of images while the notification is provided to the user.

The camera poses 113 may also be used by the 3D model generation unit 115 to generate a 3D model (e.g., an initial 3D model or a "point cloud"). An anomaly detection unit 116 may analyze the 3D model to determine whether the 3D model includes an anomaly (e.g., a discontinuity of a surface, a missing or incomplete region, etc.). If the anomaly detection unit 116 detects an anomaly in the 3D model, the anomaly detection unit 116 may cause the display 104 to display an indicator that identifies a location of the anomaly in the 3D model. Alternatively, the indicator may be presented via another user interface (e.g., audio speaker, light emitting diode (LED), etc.). The anomaly detection unit 116 may also provide the 3D model (or data representing the 3D model) to a 3D model optimizer 118.

The 3D model optimizer 118 or the anomaly detection unit 116 may cause the display 104 to present one or more selectable options to enable correction of the anomaly. In some implementations, the options are selectable via a display (e.g., the display 104). In other implementations, the options are selectable via one or more other user interfaces (e.g., a speaker, a microphone, a keypad, etc.). The options may include an option to activate a refiner unit 120 to enable the system 100 to capture additional images in order to correct the anomaly. The options may also include an option to activate a hole filler unit 122 to automatically generate fill data (e.g., based on a hole filling algorithm). If the refiner unit 120 is used to capture additional images, the additional images may be added to the captured images 102 to be processed by other units of the system 100 to generate a new or updated 3D model, which may also be analyzed by the anomaly detection unit 116.

The 3D model optimizer 118 may be configured to correct pixel values associated with a 3D scan of an object. The 3D model optimizer 118 may generate an enhanced 3D model (e.g., enhanced model data), which may be provided to the display 104. The enhanced 3D model may also be provided to a color correction unit 124, to a texture mapping unit 126, or to both, to perform color, light, and/or texture corrections based on the captured images 102 in the 3D model to further refine the 3D model for display at the display 104. The enhanced 3D model includes more details than the 3D model generated during the capture of the sequence of images. For example, the more details may include higher resolution, improved texture mapping, etc.

The texture mapping unit 126 may be configured to generate one or more 2D texture maps based on a captured image 102. For example, according to one implementation, the captured image 102 may be provided directly to the texture mapping unit 126. The texture mapping unit 126 includes a material property image generator 140 that is configured to generate an enhanced image (e.g., a material property image). As used herein, an "enhanced image" includes any image having pixels with values that indicate color and at least one other property. Non-limiting examples of the at least one other property may include a transparency quality, a reflection quality, a refraction quality, an ambient quality, a diffusion quality, a subsurface scattering property, etc. According to another implementation, the material property image generator 140 may be configured to generate one or more images of "non-enhanced" pixels. For example, the material property image generator 140 may generate a color image, a transparency image, a shininess image, etc. A particular pixel in one image may have a pixel location (e.g., notated by an x-coordinate and a y-coordinate) that is similar to a pixel location of the particular pixel in another image. As a non-limiting example, a particular pixel in the transparency image may have the same pixel location in the shininess image as the transparency image.

The enhanced image may be used by the texture mapping unit 126 to generate a 2D texture map (e.g., a material property texture map). Non-limiting examples of a material property texture map include a translucence texture map, a translucence depth texture map, an eccentricity texture map, a normal map, a displacement map, a translucency color texture map, a cosine power map, a specular texture map, a transparency texture map, a bump texture map, a light emission property texture map, a bidirectional reflectance distribution function (BRDF) texture map, etc. According to one implementation, the BRDF texture map may identify different BRDF functions (e.g., Phong, Lambert, Blinn, Anisotropic, etc.) by a custom identification numbering system.

According to one implementation, the material texture mapping unit 126 may be configured to determine a color of a portion of an object using the captured image 102. The material property image generator 140 may be configured to determine a material of the particular portion of the object using the captured image 102. The material property image generator 140 may also be configured to determine at least one other property of the particular portion of the object based on the material. For example, in response to identifying the material, the material property image generator 140 may access a database specifying different properties (e.g., transparency properties, reflection properties, refraction properties, diffusion properties, subsurface scattering properties, etc.) of the material. The material property image generator 140 may generate a pixel value representative of the color of the particular portion of the object and representative of the at least one other property of the particular portion of the object. Based on the pixel value, the material property image generator 140 may generate an enhanced image. The texture mapping unit 126 may be configured to generate a 2D texture map based on the enhanced image.

The system 100 of FIG. 1 may enable generation of enhanced 2D texture maps that adequately portray non-color properties (in addition to color properties) of an object. For example, by determining a material of the object, the texture mapping unit 126 may generate enhanced 2D texture maps that adequately portray a transparency of the object, surface properties (e.g., bumpiness, smoothness, etc.) of the object, light emission properties of the object, etc. The enhanced 2D texture maps may be used to create a more "life-like" 3D model of the object using computer vision techniques.

Figure 2:
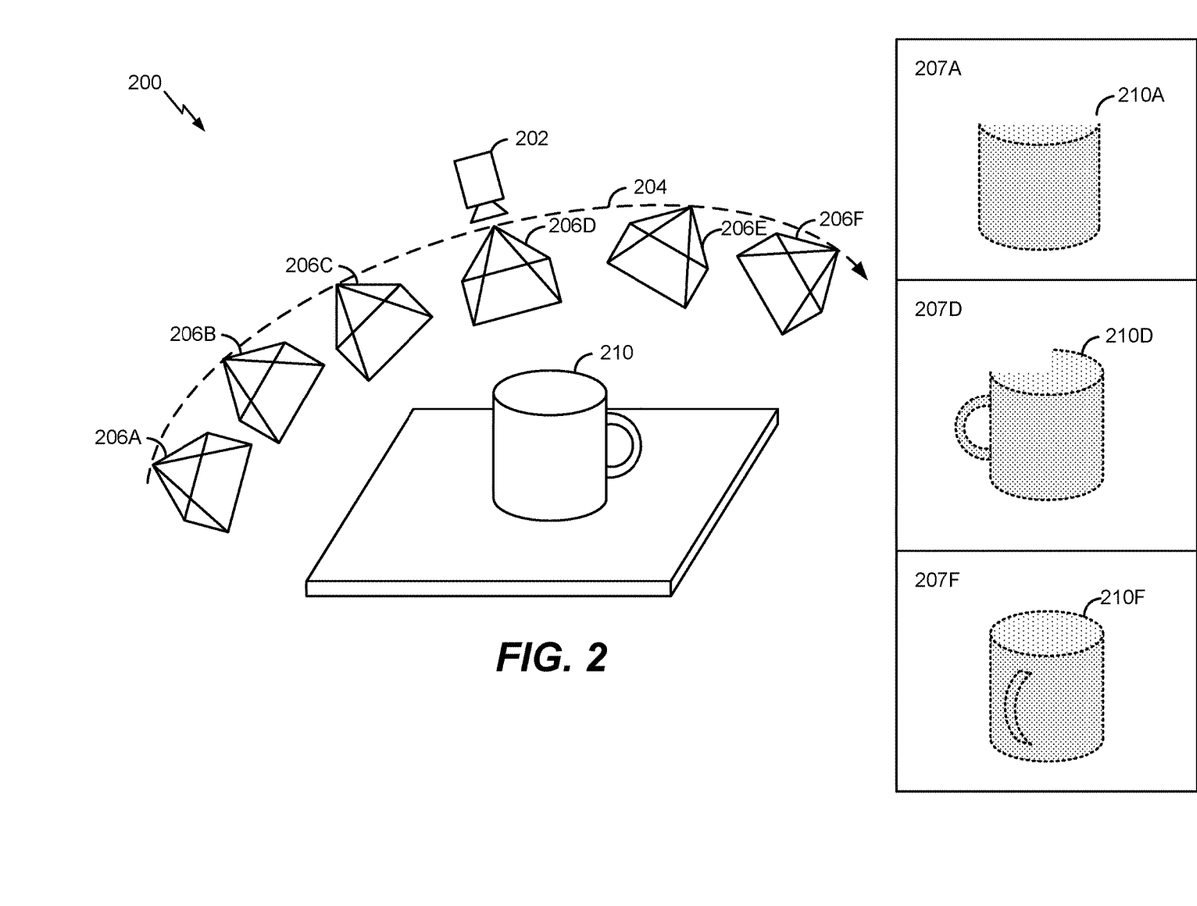
FIG. 2 is a diagram that illustrates a plurality of camera poses.

Referring to FIG. 2, an illustrative implementation of operation of the system 100 of FIG. 1 is shown and generally designated 200. In FIG. 2, an image capture device 202 (e.g., a two-dimensional camera, a depth sensing camera, a three-dimensional camera, etc.) is moved along a path 204 (e.g., an arc) relative to an object 210, such as a cup as shown in FIG. 2. During the movement of the image capture device 202 along the path 204, the image capture device 202 is located at various positions and orientations illustrated in FIG. 2 by camera poses 206A, 206B, 206C, 206D, 206E, and 206F. The camera poses 206A-F correspond to image capture operations that generate image frames in a sequence of image frames captured by the image capture device 202. It should be noted that the number, separation, and orientation of the camera poses 206A-F shown in FIG. 2 are shown for illustration only, and are not to be considered limiting. For example, more camera poses or fewer camera poses may be used with different intervals between consecutive (or adjacent) camera poses.

The path 204 may be of any configuration, based on how the image capture device 202 is moved around the object 210. As the image capture device 202 is moved along the path 204 from a position associated with the camera pose 206A to a position associated with the camera pose 206F, a 3D point cloud of the object 210 may be generated in real time or near-real time based on the camera poses 206A-F and the sequence of image frames. For example, at the camera pose 206A, which represents an initial camera pose of the image capture device 202 at a first position along the path 204, a first partial 3D point cloud 210A may be generated at the image capture device 202, as shown at 207A. As the image capture device 202 continues to move along the path 204, additional data may be captured and used to add points to the partial 3D point cloud. For example, when the image capture device 202 has moved along the path 204 to a position associated with the camera pose 206D, a more complete 3D point cloud 210D may be generated, as shown at 207D. After the image capture device 202 reaches a position associated with the camera pose 206F, a completed 3D point cloud 210F may be generated, as shown at 207F.

Although FIG. 2 is described with respect to the image capture device 202 moving along the path 204 to capture image frames of a stationary object, in other implementations, the object (or a scene that includes the object) may move relative to a stationary image capture device (e.g., a fixed camera) to generate image frames. In other implementations, the object and the image capture device 202 may both move during generation of the image frames.

Figure 3:
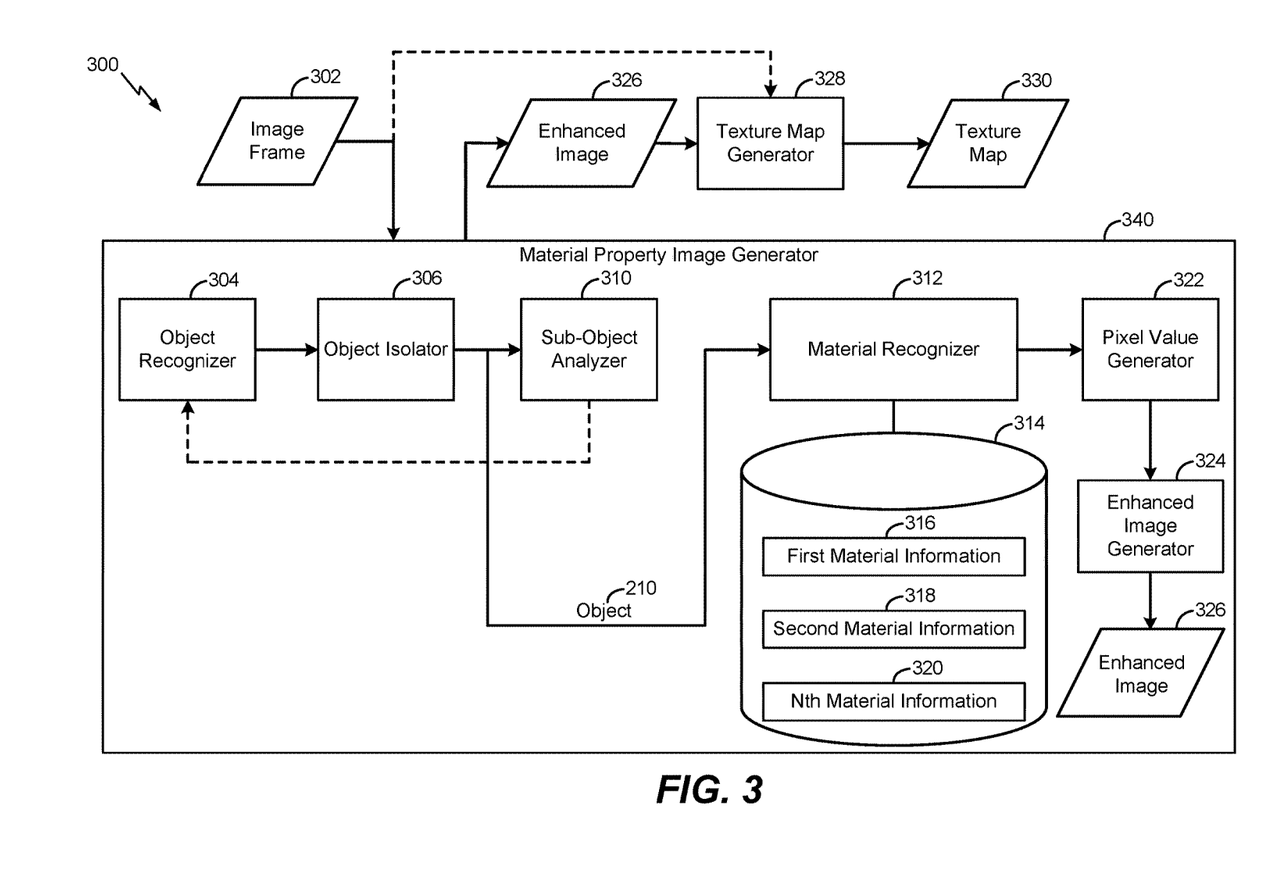
FIG. 3 is a block diagram of a texture mapping unit that is operable to generate one or more 2D texture maps of an object.

Referring to FIG. 3, a texture mapping unit 300 is shown. According to one implementation, the texture mapping unit 300 may include (or operate in a substantially similar manner as) the texture mapping unit 126 of FIG. 1. For example, the texture mapping unit 300 may be implemented in the system 100 of FIG. 1. The texture mapping unit 300 may be operable to generate one or more 2D texture maps of an object. The texture mapping unit 300 includes a material property image generator 340 and a texture map generator 328. According to one implementation, the material property image generator 340 may include (or operate in a substantially similar manner as) the material property image generator 140 of FIG. 1.

Figure 4:
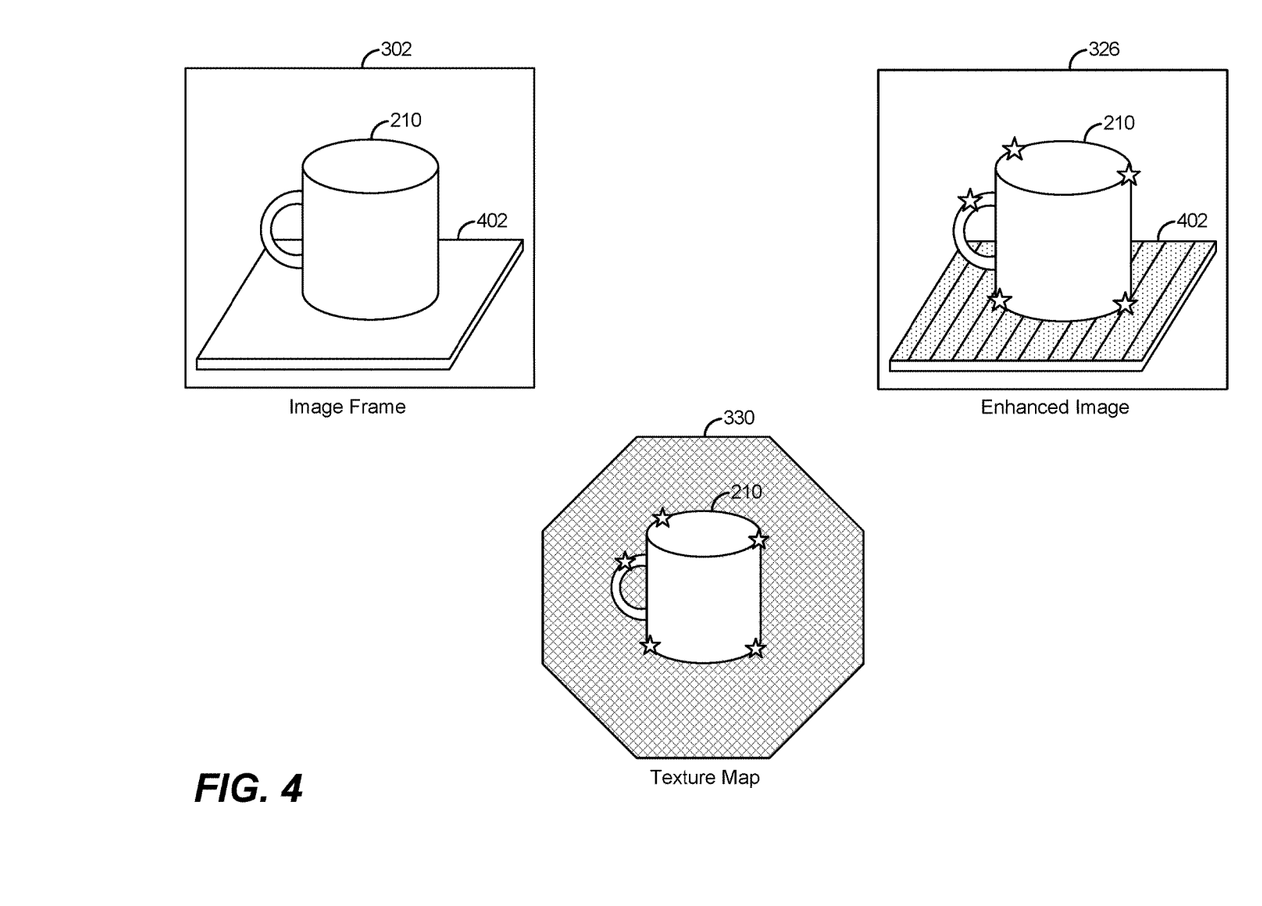
FIG. 4 is a diagram that depicts an image frame, a material property image generated based on the image frame, and a texture map generated based on the material property image.

An image frame 302 may be captured by an image capture device (not shown in FIG. 3). According to one implementation, the image frame 302 may be captured by the image capture device 202 of FIG. 2. For example, the image frame 302 may be captured while the image capture device 202 is at a position associated with the camera pose 206D. A depiction of the image frame 302 is shown in FIG. 4. As illustrated in FIG. 4, the image frame 302 includes the object 210 of FIG. 2 (e.g., the cup) and an object 402 (e.g., a table). According to one implementation, the image frame 302 may be a color image. Referring to back to FIG. 3, the image frame 302 may be provided to the material property image generator 340. According to some implementations, the image frame 302 may be provided to the texture map generator 328.

The material property image generator 340 includes an object recognizer 304, an object isolator 306, a sub-object analyzer 310, a material recognizer 312, a database 314, a pixel value generator 322, and an enhanced image generator 324. According to some implementations, the material property image generator 340 may include fewer (or additional components). According to one implementation, one or more components in the material property image generator 340 may be combined into a single component.

The object recognizer 304 may be configured to receive the image frame 302 from the image capture device. The object recognizer 304 may be configured to perform object recognition on the image frame 302. For example, the object recognizer 304 may identify the object 210 in the image frame 302. After object recognition, the object isolator 306 may be configured to isolate the object 210 in the image frame 302 using image segmentation. For example, the object isolator 306 may extract the portion of the image frame 302 corresponding to the object 210 and provide the extracted portion (e.g., the object 210) to the material recognizer 312.

According to some implementations, after the object isolation, the sub-object analyzer 310 may analyze the image frame 302 to determine whether additional objects are present in the image frame 302, whether the object 210 includes any smaller objects (e.g., "sub-objects"), or a combination thereof. For example, the sub-object analyzer 310 may determine that the object 402 is present in the image frame 302 and may provide data associated with the determination to the object recognizer 304. In response to receiving the data, the object recognizer 304 may identify the object 402 in the image frame 302. In a similar manner as described above, the object isolator 306 may isolate the object 402 in the image frame 302 using image segmentation. For example, the object isolator 306 may extract the portion of the image frame 302 corresponding to the object 402 and provide the extracted portion (e.g., the object 402) to the material recognizer 312.

The material recognizer 312 may be configured to determine a material of the object 210. To illustrate, the material recognizer 312 may access the database 314 to identify the material of the object 210 based on the object recognition. The database 314 may include first material information 316 associated with a first object, second material information 318 associated with a second object, and Nth material information 320 associated with an Nth object. N may be any integer that is greater than zero. For example, if N is equal to nine, the database 314 may store nine different items of material information associated with nine different objects.

If the first object includes a cup, the material recognizer 312 may access the database 314 to retrieve the first material information 316 associated with the first object. The first material information 316 may indicate the material that the object 210 (e.g., the cup) is comprised of (or the material that similar objects are comprised of). As a non-limiting example, the first material information 316 may indicate that a cup is typically comprised of glass. The first material information 316 may also indicate properties of the determined material (e.g., glass). As non-limiting examples, the first material information 316 may indicate a transparency quality for glass, a reflection quality for glass, a refraction quality for glass, an ambient quality for glass, a diffusion quality for glass, a subsurface scattering property for glass, a property based on a BRDF, or a combination thereof. Thus, the material recognizer 312 may access the database 314 associated with different objects to identify the material of the object 210 and properties of the material based on the object recognition. The first material information 316 may be provided to the pixel value generator 322.

In some implementations, the material recognizer 312 may determine the material of the object 210 based on detected features of the object 210 without requiring object recognition. For example, object recognition operations (associated with the object recognizer 304, the object isolator 306, and the sub-object analyzer 310) may be bypassed and the material recognizer 312 may detect particular features of the object 210. Based on the detected features, the material recognizer 312 may determine the material of the object 210 and properties of the material. To illustrate, the material recognizer 312 may determine that the object 210 is smooth, shiny, and relatively clear without performing object recognition operations. Based on the features, the material recognizer 312 may determine that the object 210 is made of glass. According to one implementation, the material recognizer 312 may use computer vision, machine learning, or a combination thereof, to determine the material of the object 210 while bypassing the object recognition operations.

The pixel value generator 322 may be configured to generate pixel values (for different pixels of the object 210) representative of the color of the object 210 and representative of at least one other property of the object 210. The other property of the object 210 may be based on the first material information 316. As a non-limiting example, the first material information 316 may indicate that glass is partially transparent. To illustrate, the first material information 316 may indicate that glass has a transparency value of four (on a scale from one to ten), where one indicates zero transparency and ten indicates absolute transparency (e.g., clear). As another non-limiting example, the first material information 316 may also indicate that glass has a refraction value of five on a scale from one to ten. Thus, the object 210 (e.g., the cup) may appear relatively "shiny" to the human eye after rendering because light may bend when it touches the surface of the cup.

To generate the pixel value, the pixel value generator 322 may apply the first material information 316 to a red-green-blue-alpha (RGBA) channel. To illustrate, the material recognizer 312 may encode all of the properties identified for a particular material using a 32-bit identifier. For example, the first material information 316 may be encoded as a first 32-bit identifier, the second material information 318 may be encoded as a second 32-bit identifier, and the Nth material information 320 may be encoded as an Nth 32-bit identifier. The pixel value generator 322 may apply the bit values (e.g., the first 32-bit identifier) to the RGBA channel to generate the pixel values for the object 210. According to one implementation, the pixel value generator 322 may also apply the bit values of the color information (associated with the color of the object 210) to the RGBA channel to generate the pixel values for the object 210. The pixel values may be provided to the enhanced image generator 324 (e.g., the material image generator).

The enhanced image generator 324 may be configured to generate an enhanced image 326 based on the pixel values. Referring to FIG. 4, the object 210 in the enhanced image 326 is shinier than the object 210 in the image frame 302. For example, encoding the RGBA channel with the first material information 316 at the pixel value generator 322 may produce pixel values that have a relatively high refraction quality. The object 210 in the enhanced image 326 is also more transparent than the object 210 in the image frame 302. For example, encoding the RGBA channel with the first material information 316 at the pixel value generator 322 may produce pixel values that portray a relatively high level of transparency.

The object 402 in the enhanced image 326 also looks different than the object 402 in the image frame 302. For example, the object 402 in the enhanced image looks more "wooden" and "grainier" than the objet 402 in the image frame 302. Similar techniques as described with respect to the object 210 in the enhanced image 326 may be used to generate the object 402 in the enhanced image 326. For example, the material recognizer 312 may access the database 314 to retrieve the second material information 318 if the second object (associated with the second material information 318) is a table. The second material information 318 may indicate the material that the object 402 (e.g., the table) is comprised of (or the material that similar objects are comprised of). As a non-limiting example, the second material information 318 may indicate that the material for a table is typically wood. The second material information 318 may also indicate properties of the material. As a non-limiting example, the second material information 318 may indicate that wood is typically rough (e.g., "grainy") and may indicate other properties (e.g., refraction, transparency, diffusion, etc.) of wood. The pixel value generator 322 may generate pixel values (for different pixels of the object 402) representative of the color of the object 402 and representative of at least one other property of the object 402. The other property of the object 402 may be based on the second material information 318. The pixel value generator 322 may apply the bit values (e.g., the second 32-bit identifier) to the RGBA channel to generate the pixel values for the object 402, and the enhanced image generator 324 may generate the enhanced image 326 based on the pixel values, as described above.

Referring back to FIG. 3, the material property image generator 340 may provide the enhanced image 326 to a texture map generator 328. As described above, according to one implementation, the image frame 302 may also be provided to the texture map generator 328. The texture map generator 328 may be configured to generate a texture map 330 (e.g., a 2D texture map) based on the enhanced image 326. For example, the texture map generator 328 may use the enhanced image 326 (e.g., a "material identification image") to access a set of property values in a database (not shown) and may generate the texture map 330 based on the property values. To illustrate, the texture map generator 328 may encode a property value for each image pixel in the enhanced image 326 to generate the texture map 330. A property value may be a 32-bit floating point number or a 32-bit integer. The property values may also be used as proxy values for the 32-bit RGBA color of a pixel. A depiction of the texture map 330 is shown in FIG. 4. According to one implementation, the texture map 330 may be applied to a 3D model of the object 210 to generate a "real-life" 3D model using computer vision techniques.

Alternatively, the texture map generator 328 may generate multiple texture maps (based on multiple enhanced images) instead of generating the single texture map 330. For example, each enhanced image may be based on a single property, and the texture map generator 328 may generate a texture map for each property. As non-limiting examples, the texture map generator 328 may generate a translucence map, a translucence depth map, a specular map, an eccentricity map, a bump map, a normal map, a displacement map, a translucency color map, a cosine power map, or a combination thereof.

The texture mapping unit 300 of FIG. 3 may enable generation of enhanced 2D texture maps that adequately portray non-color properties (in addition to color properties) of an object. For example, by determining a material of the object, the texture mapping unit 300 may generate enhanced 2D texture maps that adequately portray a transparency of the object, surface properties (e.g., bumpiness, smoothness, etc.) of the object, light emission properties of the object, etc. The enhanced 2D texture maps may be used to create a more "life-like" 3D model of the object using computer vision techniques.

Figure 5:
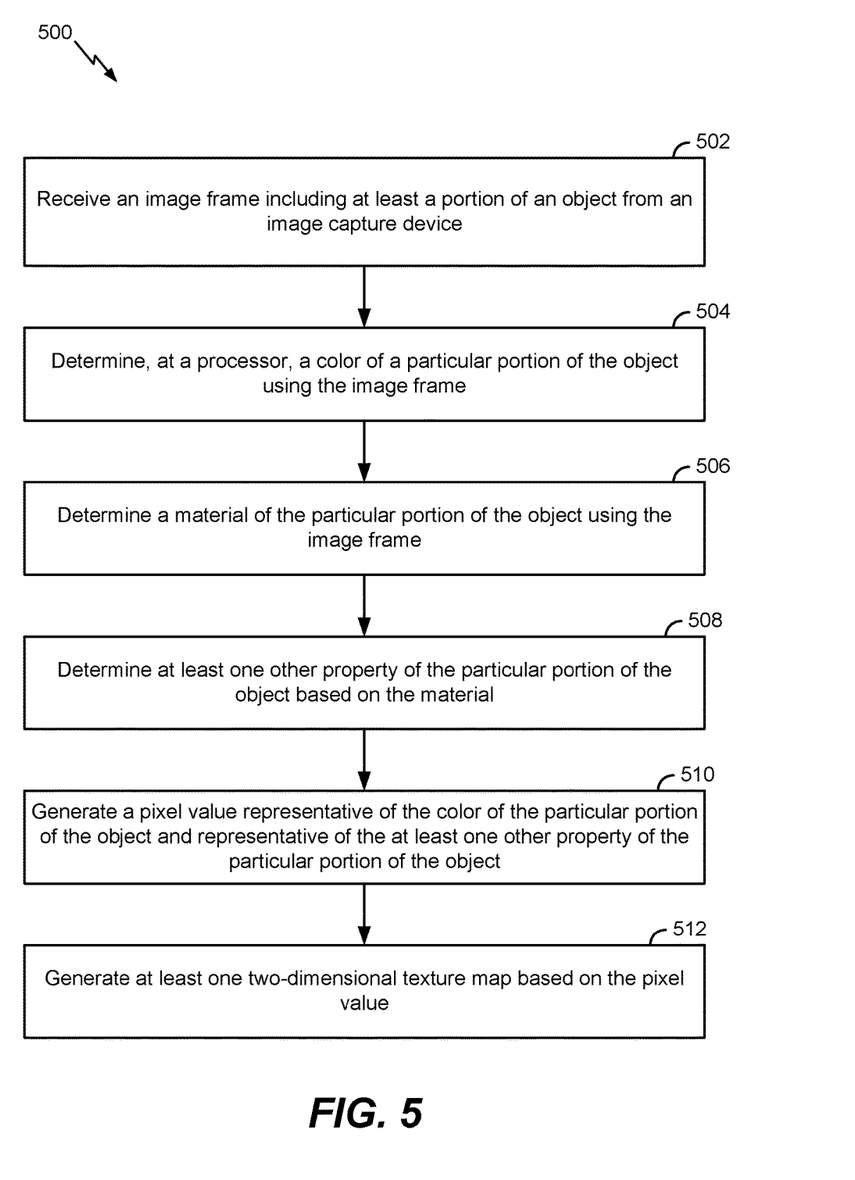
FIG. 5 is a flow diagram of a method of generating one or more 2D texture maps of an object.

Referring to FIG. 5, a method 500 of generating one or more 2D texture maps of an object is depicted. The method 500 may be performed by the texture mapping unit 126 of FIG. 1, the texture mapping unit 300 of FIG. 3, or both.

The method 500 includes receiving an image frame including at least a portion of the object from an image capture device, at 502. For example, referring to FIGS. 2 and 3, the image frame 302 may be captured by the image capture device 202. The object recognizer 304 may receive the image frame 302 from the image capture device 202.

A color of a particular portion of the object may be determined using the image frame, at 504. For example, referring to FIG. 1, the color correction unit 124 or the texture mapping unit 126 may determine the color of the particular portion of the object 210.

A material of the particular portion of the object may be determined using the image frame, at 506. For example, referring to FIG. 3, the material recognizer 312 may determine the material of the object 210. To illustrate, the material recognizer 312 may access the database 314 to identify the material of the object 210 based on the object recognition. For example, the material recognizer 312 may access the database 314 to retrieve the first material information 316 associated with the first object. The first material information 316 may indicate the material that the object 210 (e.g., the cup) is comprised of (or the material that similar objects are comprised of). As a non-limiting example, the first material information 316 may indicate that the material of the object 210 is glass.

According to another implementation of the method 500, determining the material of the particular portion of the object includes detecting at least one particular feature of the particular portion of the object and determining the material of the particular portion of the object based on the particular feature. For example, the material recognizer 312 may determine the material of the object 210 based on detected features of the object 210 without requiring object recognition. For example, object recognition operations may be bypassed and the material recognizer 312 may detect particular features of the object 210. Based on the detected features, the material recognizer 312 may determine the material of the object 210 and properties of the material. To illustrate, the material recognizer 312 may determine that the object 210 is smooth, shiny, and relatively clear without performing object recognition operations. Based on the features, the material recognizer 312 may determine that the object 210 is made of glass.

At least one other property of the particular portion of the object may be determined based on the material, at 508. For example, referring to FIG. 3, the material recognizer 312 may also access the database 314 to retrieve properties of glass (e.g., properties of the determined material of the object 210). As non-limiting examples, the first material information 316 may indicate a transparency quality for glass, a reflection quality for glass, a refraction quality for glass, an ambient quality for glass, a diffusion quality for glass, a subsurface scattering property for glass, a property based on a BRDF, or a combination thereof. Thus, the material recognizer 312 may access the database 314 associated with different objects to identify the material of the object 210 and properties of the material based on the object recognition.

A pixel value representative of the color of the particular portion of the object and representative of the at least one other property of the particular portion of the object may be generated, at 510. For example, referring to FIG. 3, the pixel value generator 322 may generate pixel values (for different pixels of the object 210) representative of the color of the object 210 and representative of at least one other property of the object 210. To generate the pixel value(s), the pixel value generator 322 may apply material information (e.g., the first material information 316) associated with the material to a RGBA channel and may apply color information associated with the color to the RGBA channel.

At least one two-dimensional texture map may be generated based on the pixel value, at 512. For example, referring to FIG. 3, the enhanced image generator 324 may generate the enhanced image 326 based on the pixel value(s), and the texture map generator 328 may generate the texture map 330 based on the enhanced image 326.

According to one implementation of the method 500, determining the at least one other property of the particular portion of the object, at 508, includes determining a first property of the particular portion of the object and determining a second property of the particular portion of the object. Generating the at least one two-dimensional texture map, at 512, may include generating a first two-dimensional texture map and generating a second two-dimensional texture map. The first two-dimensional texture map may be based on the first property and the second two-dimensional texture map may be based on the second property. Alternatively, generating the at least one two-dimensional texture map, at 512, may include generating a two-dimensional texture map associated with the first property and the second property.

The method 500 of FIG. 5 may enable generation of enhanced 2D texture maps that adequately portray non-color properties (as well as color properties) of an object. For example, by determining a material of the object, the texture mapping unit 300 may generate enhanced 2D texture maps that adequately portray a transparency of the object, surface properties (e.g., bumpiness, smoothness, etc.) of the object, light emission properties of the object, etc. The enhanced 2D texture maps may be used to create a more "life-like" 3D model of the object using computer vision techniques.

Figure 6:
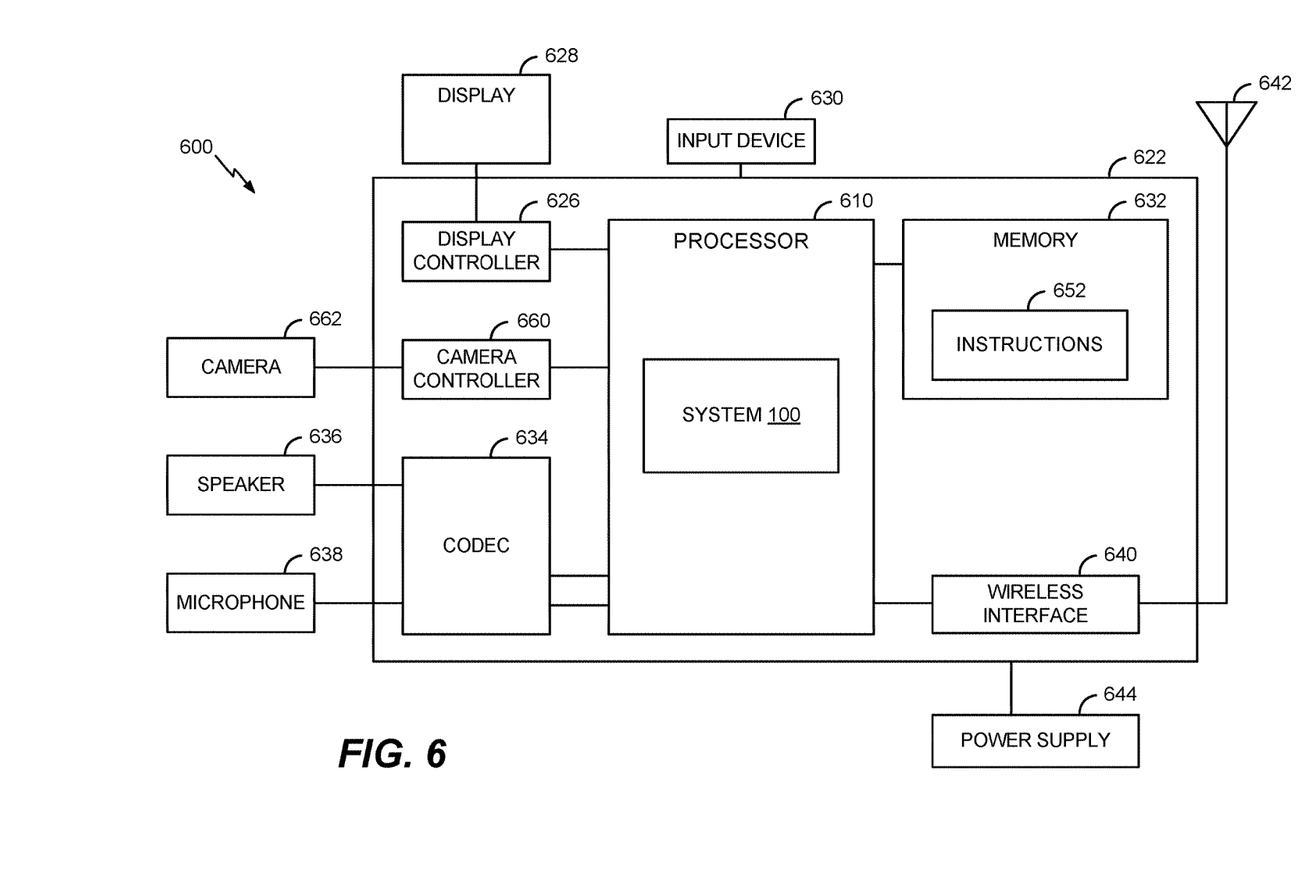
FIG. 6 is a block diagram of a computing device that includes components configured to perform one or more of the techniques, methods, and processes described with respect to FIGS. 1-5.

Referring to FIG. 6, a block diagram of a particular illustrative implementation of an electronic device, such as a wireless communication device, is depicted and generally designated 600. The device 600 includes a processor 610, such as a digital signal processor (DSP), coupled to a memory 632. The processor 610 may include hardware or executable instructions that cause the processor to perform the method 500 of FIG. 5. According to some implementations, the processor 610 may include the system 100 of FIG. 1. The memory 632 may be a non-transient or non-transitory computer readable medium storing computer-executable instructions 652 to perform all or a portion of one or more operations described with reference to FIGS. 1-5.

FIG. 6 also shows a display controller 626 that is coupled to the digital signal processor 610 and to a display 628, such as the display 104 of FIG. 1. A coder/decoder (CODEC) 634 can also be coupled to the digital signal processor 610. A speaker 636 and a microphone 638 can be coupled to the CODEC 634.

FIG. 6 also indicates that a wireless interface 640 can be coupled to the processor 610 and to an antenna 642. A camera 662 may be coupled to the processor 610 via a camera controller 660. For example, the camera controller 660 may include interface circuitry that is configured to receive image frames of an object. The interface circuitry may correspond to circuitry that receives the captured image frames from the camera 662 and provides the captured image frames to the processor 610. The image frames may be associated with a three-dimensional scan of the object. The camera 662 may include a 2D camera, a 3D camera, a 3D sensor, a depth-sensing camera (e.g., an RGB-D camera), or any other device configured to capture images. According to one implementation, the camera 662 may include the image capture device 202 of FIG. 2. In a particular implementation, the processor 610, the display controller 626, the camera controller 660, the memory 632, the CODEC 634, and the wireless interface 640 are included in a system-in-package or system-on-chip device 622. In a particular implementation, an input device 630 and a power supply 644 are coupled to the system-on-chip device 622. Moreover, in a particular implementation, as illustrated in FIG. 6, the display 628, the input device 630, the speaker 636, the microphone 638, the antenna 642, the camera 662, and the power supply 644 are external to the system-on-chip device 622. However, each of the display 628, the input device 630, the speaker 636, the microphone 638, the antenna 642, the camera 662, and the power supply 644 can be coupled to a component of the system-on-chip device 622, such as an interface or a controller.

In conjunction with the described implementations, an apparatus for generating one or more two-dimensional texture maps of an object includes means for capturing an image frame that includes at least a portion of the object. For example, the means for capturing the image frame may include the image capture device 202 of FIG. 2, the camera 662 of FIG. 6, the camera controller 660 of FIG. 6, one or more other structures, devices, circuits, or a combination thereof.

The apparatus may also include means for determining a color of a particular portion of the object using the image frame. For example, the means for determining the color of the particular portion of the object may include the color correction unit 124 of FIG. 1, the texture mapping unit 126 of FIG. 1, the texture mapping unit 300 of FIG. 3, the processor 610 of FIG. 6, one or more other structures, devices, circuits, or a combination thereof.

The apparatus may also include means for determining a material of the particular portion of the object using the image frame. For example, the means for determining the material of the particular portion of the object may include the texture mapping unit 126 of FIG. 1, the texture mapping unit 300 of FIG. 3, the material recognizer 312 of FIG. 3, the database 314 of FIG. 3, the processor 610 of FIG. 6, one or more other structures, devices, circuits, or a combination thereof.

The apparatus may also include means for determining at least one other property of the particular portion of the object based on the material. For example, the means for determining the at least one other property of the particular portion of the object may include the texture mapping unit 126 of FIG. 1, the texture mapping unit 300 of FIG. 3, the material recognizer 312 of FIG. 3, the database 314 of FIG. 3, the processor 610 of FIG. 6, one or more other structures, devices, circuits, or a combination thereof.

The apparatus may also include means for generating a pixel value representative of the color of the particular portion of the object and representative of the at least one other property of the particular portion of the object. For example, the means for generating the pixel value may include the texture mapping unit 126 of FIG. 1, the texture mapping unit 300 of FIG. 3, the pixel value generator 322 of FIG. 3, the processor 610 of FIG. 6, one or more other structures, devices, circuits, or a combination thereof.

The apparatus may also include means for generating at least one two-dimensional texture map based on the pixel value. For example, the means for generating the 2D texture map may include the texture mapping unit 126 of FIG. 1, the texture mapping unit 300 of FIG. 3, the texture map generator 328 of FIG. 3, the processor 610 of FIG. 6, one or more other structures, devices, circuits, or a combination thereof.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A method for generating one or more two-dimensional texture maps of an object, the method comprising:
   receiving an image frame including at least a portion of the object from an image capture device;
   determining, at a processor, a color of a particular portion of the object using the image frame;
   determining a material of the particular portion of the object using the image frame, wherein determining the material comprises:
      performing object recognition on the object, the object recognition independent of the material; and
      accessing a database of materials associated with different objects to identify the material based on the object recognition;
   determining at least one other property of the particular portion of the object based on the material;
   generating a pixel value representative of the color of the particular portion of the object and representative of the at least one other property of the particular portion of the object; and
   generating at least one two-dimensional texture map based on the pixel value.

2. The method of claim 1, wherein generating the at least one two-dimensional texture map comprises:
   generating an enhanced image based on the pixel value; and
   generating the at least one two-dimensional texture map based on the enhanced image.

3. The method of claim 1, wherein determining the material of the particular portion of the object further comprises:
   detecting at least one particular feature of the particular portion of the object; and
   determining the material of the particular portion of the object based on the particular feature.

4. The method of claim 1, wherein generating the pixel value comprises:
   applying material information associated with the material to a red-green-blue-alpha channel;
   applying color information associated with the color to the red-green-blue-alpha channel; and
   generating the pixel value based on an output of the red-green-blue channel.

5. The method of claim 1, wherein determining the at least one other property of the particular portion of the object comprises determining a first property of the particular portion of the object and determining a second property of the particular portion of the object.

6. The method of claim 5, wherein generating the at least one two-dimensional texture map comprises:
   generating a first two-dimensional texture map, the first two-dimensional texture map associated with the first property; and
   generating a second two-dimensional texture map, the second two-dimensional texture map associated with the second property.

7. The method of claim 5, wherein generating the at least one two-dimensional texture map comprises generating a two-dimensional texture map associated with the first property and the second property.

8. The method of claim 1, wherein the at least one other property of the particular portion of the object includes a transparency quality, a reflection quality, a refraction quality, an ambient quality, a diffusion quality, a subsurface scattering property, a property based on a Bidirectional Reflectance Distribution Function (BRDF), or a combination thereof.

9. The method of claim 1, wherein the at least one other property of the particular portion of the object is based on a map selected from the group consisting of a translucence map, a translucence depth map, a specular map, an eccentricity map, a bump map, a normal map, a displacement map, a translucency color map, and a cosine power map.

10. The method of claim 1, the method being executable on a wireless communication device, wherein the wireless communication device comprises:
    a memory configured to store image data;
    a processor configured to execute instructions to process the image data stored at the memory; and
    a receiver configured to receive the image data, wherein the image data correspond to the image frame.

11. The method of claim 10, wherein the wireless communication device is a mobile phone, and wherein the image data is modulated according to a communication standard.

12. An apparatus for generating one or more two-dimensional texture maps of an object, the apparatus comprising:
    a processor; and
    a memory storing instructions executable by the processor to perform operations comprising:
       determining a color of a particular portion of the object using an image frame that includes at least a portion of the object, the image frame captured by an image capture device;
       determining a material of the particular portion of the object using the image frame, wherein determining the material comprises:
          performing object recognition on the object, the object recognition independent of the material; and
          accessing a database of materials associated with different objects to identify the material based on the object recognition;
       determining at least one other property of the particular portion of the object based on the material;
       generating a pixel value representative of the color of the particular portion of the object and representative of the at least one other property of the particular portion of the object; and
       generating at least one two-dimensional texture map based on the pixel value.

13. The apparatus of claim 12, wherein generating the at least one two-dimensional texture map comprises:
    generating an enhanced image based on the pixel value; and
    generating the at least one two-dimensional texture map based on the enhanced image.

14. The apparatus of claim 12, wherein determining the material of the particular portion of the object further comprises:
    detecting at least one particular feature of the particular portion of the object; and
    determining the material of the particular portion of the object based on the particular feature.

15. The apparatus of claim 12, wherein generating the pixel value comprises:
    applying material information associated with the material to a red-green-blue-alpha channel;
    applying color information associated with the color to the red-green-blue-alpha channel; and
    generating the pixel value based on an output of the red-green-blue channel.

16. The apparatus of claim 12, wherein determining the at least one other property of the particular portion of the object comprises determining a first property of the particular portion of the object and determining a second property of the particular portion of the object.

17. The apparatus of claim 16, wherein generating the at least one two-dimensional texture map comprises:
generating a first two-dimensional texture map, the first two-dimensional texture map associated with the first property; and
generating a second two-dimensional texture map, the second two-dimensional texture map associated with the second property.

18. The apparatus of claim 16, wherein generating the at least one two-dimensional texture map comprises generating a two-dimensional texture map associated with the first property and the second property.

19. The apparatus of claim 12, wherein the at least one other property of the particular portion of the object includes a transparency quality, a reflection quality, a refraction quality, an ambient quality, a diffusion quality, a subsurface scattering property, a property based on a Bidirectional Reflectance Distribution Function (BRDF), or a combination thereof.

20. The apparatus of claim 12, wherein the at least one other property of the particular portion of the object is based on a map selected from the group consisting of a translucence map, a translucence depth map, a specular map, an eccentricity map, a bump map, a normal map, a displacement map, a translucency color map, and a cosine power map.

21. A non-transitory computer-readable medium comprising instructions for generating one or more two-dimensional texture maps of an object, the instructions, when executed by a processor, cause the processor to perform operations comprising:
determining a color of a particular portion of the object using an image frame that includes at least a portion of the object, the image frame captured by an image capture device;
determining a material of the particular portion of the object using the image frame, wherein determining the material comprises:
performing object recognition on the object, the object recognition independent of the material; and
accessing a database of materials associated with different objects to identify the material based on the object recognition;
determining at least one other property of the particular portion of the object based on the material;
generating a pixel value representative of the color of the particular portion of the object and representative of the at least one other property of the particular portion of the object; and
generating at least one two-dimensional texture map based on the pixel value.

22. The non-transitory computer-readable medium of claim 21, wherein generating the at least one two-dimensional texture map comprises:
generating an enhanced image based on the pixel value; and
generating the at least one two-dimensional texture map based on the enhanced image.

23. The non-transitory computer-readable medium of claim 21, wherein determining the material of the particular portion of the object further comprises:
detecting at least one particular feature of the particular portion of the object; and
determining the material of the particular portion of the object based on the particular feature.

24. The non-transitory computer-readable medium of claim 21, wherein generating the pixel value comprises:
applying material information associated with the material to a red-green-blue-alpha channel;
applying color information associated with the color to the red-green-blue-alpha channel; and
generating the pixel value based on an output of the red-green-blue channel.

25. The non-transitory computer-readable medium of claim 21, wherein determining the at least one other property of the particular portion of the object comprises determining a first property of the particular portion of the object and determining a second property of the particular portion of the object.

26. The non-transitory computer-readable medium of claim 25, wherein generating the at least one two-dimensional texture map comprises:
generating a first two-dimensional texture map, the first two-dimensional texture map associated with the first property; and
generating a second two-dimensional texture map, the second two-dimensional texture map associated with the second property.

27. The non-transitory computer-readable medium of claim 25, wherein generating the at least one two-dimensional texture map comprises generating a two-dimensional texture map associated with the first property and the second property.

28. An apparatus for generating one or more two-dimensional texture maps of an object, the apparatus comprising:
means for capturing an image frame including at least a portion of the object;
means for determining a color of a particular portion of the object using the image frame;
means for determining a material of the particular portion of the object using the image frame, wherein means for determining the material comprises:
means for performing object recognition on the object, the object recognition independent of the material; and
means for storing materials associated with different objects, the means for storing usable to identify the material based on the object recognition;
means for determining at least one other property of the particular portion of the object based on the material;
means for generating a pixel value representative of the color of the particular portion of the object and representative of the at least one other property of the particular portion of the object; and
means for generating at least one two-dimensional texture map based on the pixel value.

29. The apparatus of claim 28, wherein the means for generating the at least one two-dimensional texture map comprises means for generating an enhanced image based on the pixel value, the at least one two-dimensional texture map based on the enhanced image.

* * * * *